(12) United States Patent
Chan et al.

(10) Patent No.: US 10,384,373 B2
(45) Date of Patent: Aug. 20, 2019

(54) MOBILE PLASTIC RECYCLING SYSTEM AND RECYCLING METHOD USING THE SAME

(71) Applicant: MINIWIZ CO., LTD., Taipei (TW)

(72) Inventors: Kong-Sang Jackie Chan, Taipei (TW); Chian-Chi Huang, Taipei (TW); Tzu-Wei Liu, Taipei (TW); Ya-Ting Chang, Taipei (TW); Tian-Jia Hsieh, Taipei (TW); Yi-Chun Chang, Taipei (TW); Chia-Chun Hsieh, Taipei (TW); Enzo-Louis Muttini, Taipei (TW)

(73) Assignee: MINIWIZ CO., LTD., Taipei (TW)

( * ) Notice: Subject to any disclaimer, the term of this patent is extended or adjusted under 35 U.S.C. 154(b) by 253 days.

(21) Appl. No.: 15/480,389

(22) Filed: Apr. 6, 2017

(65) Prior Publication Data
US 2018/0290340 A1    Oct. 11, 2018

(51) Int. Cl.
| | |
|---|---|
| *B29B 17/02* | (2006.01) |
| *B29B 17/04* | (2006.01) |
| *B29B 17/00* | (2006.01) |
| *B29B 13/00* | (2006.01) |
| *B29C 39/02* | (2006.01) |
| *B29C 39/38* | (2006.01) |
| *B29K 101/12* | (2006.01) |
| *B29K 105/00* | (2006.01) |
| *B29K 105/26* | (2006.01) |

(52) U.S. Cl.
CPC .......... *B29B 17/0412* (2013.01); *B29B 13/00* (2013.01); *B29B 17/00* (2013.01); *B29B 17/02* (2013.01); *B29C 39/02* (2013.01); *B29C 39/38* (2013.01); *B29B 2013/002* (2013.01); *B29B 2017/0015* (2013.01); *B29B 2017/0021* (2013.01); *B29B 2017/0094* (2013.01); *B29B 2017/0289* (2013.01); *B29K 2101/12* (2013.01); *B29K 2105/251* (2013.01); *B29K 2105/26* (2013.01); *Y02W 30/62* (2015.05)

(58) Field of Classification Search
CPC .. B13B 17/02; B13B 2017/0094; B29C 39/02
See application file for complete search history.

(56) References Cited

U.S. PATENT DOCUMENTS

| | | | |
|---|---|---|---|
| 5,251,832 A * | 10/1993 | Hentschel | B03B 9/061 241/101.6 |
| 6,528,009 B1 * | 3/2003 | Barchena | B29B 17/0026 264/109 |
| 2004/0159593 A1 * | 8/2004 | Allen | B03B 9/06 209/606 |

* cited by examiner

*Primary Examiner* — James Sanders

(57) ABSTRACT

Disclosed herein is a mobile plastic recycling system mounted in a vehicle. The system is configured to process a plastic article and make it into thermoplastic items. The mobile plastic recycling system includes a plastic recycling apparatus and a power supply apparatus that are electrically coupled with each other; the system also includes a vehicle configured to carry and transport the power supply apparatus and plastic recycling apparatus.

15 Claims, 8 Drawing Sheets

MOBILE PLASTIC RECYCLING SYSTEM AND RECYCLING METHOD USING THE SAME

BACKGROUND OF THE INVENTION

1. Field of the Invention

The present disclosure relates to the process and system for recycling plastic materials; more particularly, to a mobile plastic recycling system.

2. Description of Related Art

Since the resources on earth are limited, the effective utilization rate of the resource, as well as the reduction of waste, is very important for the purpose of sustained development. Currently, there are many plastic recycling systems for processing carious sorts of plastic wastes; however, these recycling systems are installed in the recycling plant, and therefore, the wastes should be collected and transported to the recycling plant. The transportation itself is time-consuming. Additionally, the carbon emission from the transportation vehicles may further jeopardize the environment.

Moreover, for remote areas where no recycling plant has been built, the recycle collectors are usually unwilling to collect recyclable wastes from these areas in view of the distance and accessibility. Therefore, considerable amounts of wastes are piled up, causing pollutions to the environment.

In view of the foregoing, there exists a need in the art for providing a mobile plastic recycling system, which may overcome the geographic limit and address the deficiency of the related art.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present disclosure is directed to a mobile plastic recycling system mounted in a vehicle; the mobile plastic recycling system is configured to process a plastic article and produce therefrom thermoplastic items that may be heat molded. The present mobile plastic recycling system may be transported to any desired location and carry out the plastic recycling process on-site; as could be appreciated, such maneuverability of the present system significantly increases the utilization rate of the plastic materials.

According to one embodiment of the present disclosure, the mobile plastic recycling system comprises a plastic recycling apparatus and a power supply apparatus that are electrically coupled with each other. The plastic recycling apparatus and the power supply apparatus are respectively mounted in a vehicle that is configured to transport the present system.

The above-mentioned plastic recycling apparatus is configured to treat the plastic article, in which the recyclable plastic article is disintegrated, cleaned, and made into plastic particles. Specifically, the plastic recycling apparatus comprises a grinding machine, a spiral cleaning device, a centrifugal device, a homogenizing device, a heating device, and a water-circulating device. The grinding machine is configured to fragment the plastic article into plastic debris, wherein the grinding machine has a first inlet and a first outlet disposed thereon. The spiral cleaning device is configured to clean the plastic debris, wherein the spiral cleaning device has a second inlet and a second outlet disposed thereon, and the second inlet is disposed under the first outlet of grinding machine. The spiral cleaning device further comprises a first spiral member disposed therein, and the first spiral member is configured to transmit the plastic debris from the second inlet to the second outlet by rotation. The centrifugal device is configured to remove water from the plastic debris, wherein the centrifugal device has a third inlet and a third outlet disposed thereon, and the third outlet is disposed under the second outlet of the spiral cleaning device. The homogenizing device is configured to mix and dry the plastic debris, and comprises a silo and a hot-air dryer. The silo has a fourth inlet and a fourth outlet disposed thereon, and comprises a second spiral member for mixing plastic debris disposed therein; the hot-air dryer is disposed at one side of the silo, and is configured to provide a high-temperature fluid to dry the plastic debris that are being mixed within the silo. The heating device is disposed within the plastic recycling apparatus, and is configured to heat and melt the plastic debris, thereby forming the thermoplastic item.

The water-circulating device comprises a recovery pipeline, a filter, and an output pipeline. The recovery pipeline is in fluid communication with the grinding machine, the spiral cleaning device, the centrifugal device, and the homogenizing device, and is configured to collect the sewage produced during the treatment process of the grinding machine, the spiral cleaning device, the centrifugal device, and the homogenizing device; the filter is in fluid communication with the recovery pipeline, and is configured to purify the collected sewage to produce clear water; and the output pipeline is in fluid communication with the grinding machine, the spiral cleaning device, the centrifugal device, and the homogenizing device, and is configured to provide the clear water to the grinding machine, the spiral cleaning device, the centrifugal device, and the homogenizing device.

The power supply apparatus comprises a hub, a first solar panel, a rechargeable battery, and a diesel-electric generator set. The hub is electrically connected to the plastic recycling apparatus, the first solar panel is disposed external to the power supply apparatus and electrically connected to the hub, the rechargeable battery is disposed within the power supply apparatus and electrically connected to the hub, in which the rechargeable battery is configured to store the electric energy; and the diesel-electric generator set is electrically connected to the rechargeable battery.

According to one embodiment of the present disclosure, the mobile plastic recycling system further comprises an air cleaning device disposed within the plastic recycling apparatus and configured to clean the air inside the plastic recycling apparatus.

In one embodiment, the mobile plastic recycling system further comprises a molding device, which is configured to accommodate the plastic debris and shape the same into the thermoplastic item.

In one specific embodiment, the molding device comprises a shaping mold and a filler mold. The shaping mold comprises a plurality of mold cavities; and the filler mold comprises a plurality of filling tubes that are disposed corresponding to the mold cavities, wherein each of the filling tubes has a distal open end that is configured to be inserted into each of the mold cavities of the shaping mold, and there is a gap between the outer wall of each filling tube and the inner wall of each mold cavity.

In one non-limiting embodiment, the gap between the outer wall of each filling tube and the inner wall of each mold cavity is 0.2-1.0 centimeter.

According to optional embodiments, the height of the filling tube is greater than the depth of the mold cavity. In some example, the height of the filling tube is at least twice the depth of the mold cavity.

According to one embodiment of the present disclosure, the mobile plastic recycling system further comprises a second solar panel disposed external to the plastic recycling apparatus, and electrically connected with the power supply apparatus.

According to one preferred embodiment of the present disclosure, the power supply apparatus and the plastic recycling apparatus are respectively disposed in two containers that are serial connected.

In another aspect, the present disclosure is directed to a method for recycling a plastic article into a thermoplastic item using the mobile plastic recycling system according to any of the above-mentioned aspect/embodiments of the present disclosure.

According to some embodiments, the method comprises the following steps:
(a) using the grinding machine to treat the plastic article, thereby producing plastic debris;
(b) using the spiral cleaning device to clean the plastic debris from the step (a), thereby removing the dirt and distain therefrom;
(c) using the centrifugal device to remove the water content from the plastic debris from the step (b);
(d) using the homogenizing device to homogenize the plastic debris from the step (c), thereby producing a plurality of plastic particles; and
(e) using the heating device to heat the plastic particles at a temperature sufficient to melt the plastic particles, thereby producing the thermoplastic item.

According to one specific embodiment of the present disclosure, in the step (c), the centrifugal device rotates at a speed of at least 1,200 rpm to remove the water content from the plastic debris; and in the step (d), the homogenizing device treats the plastic debris at at least 110° C. for one hour. In another embodiment, in the step (d), the water content of the plastic particles is less than 0.2%.

According to one embodiment of the present disclosure, in the step (e), the plastic particles are placed into a molding device, and then the heating device is used to melt the plastic particles, thereby producing the thermoplastic item.

Many of the attendant features and advantages of the present disclosure will become better understood with reference to the following detailed description considered in connection with the accompanying drawings.

BRIEF DESCRIPTION OF THE DRAWINGS

The present description will be better understood from the following detailed description read in light of the accompanying drawings, where.

FIG. 5A to FIG. 5C are schematic diagrams illustrating the appearance of the plastic recycling apparatus according to one embodiment of the present disclosure, in which FIG. 5A and FIG. 5B are viewed from the left-hand side, while FIG. 5C is viewed from the right-hand side;

Figure 1:
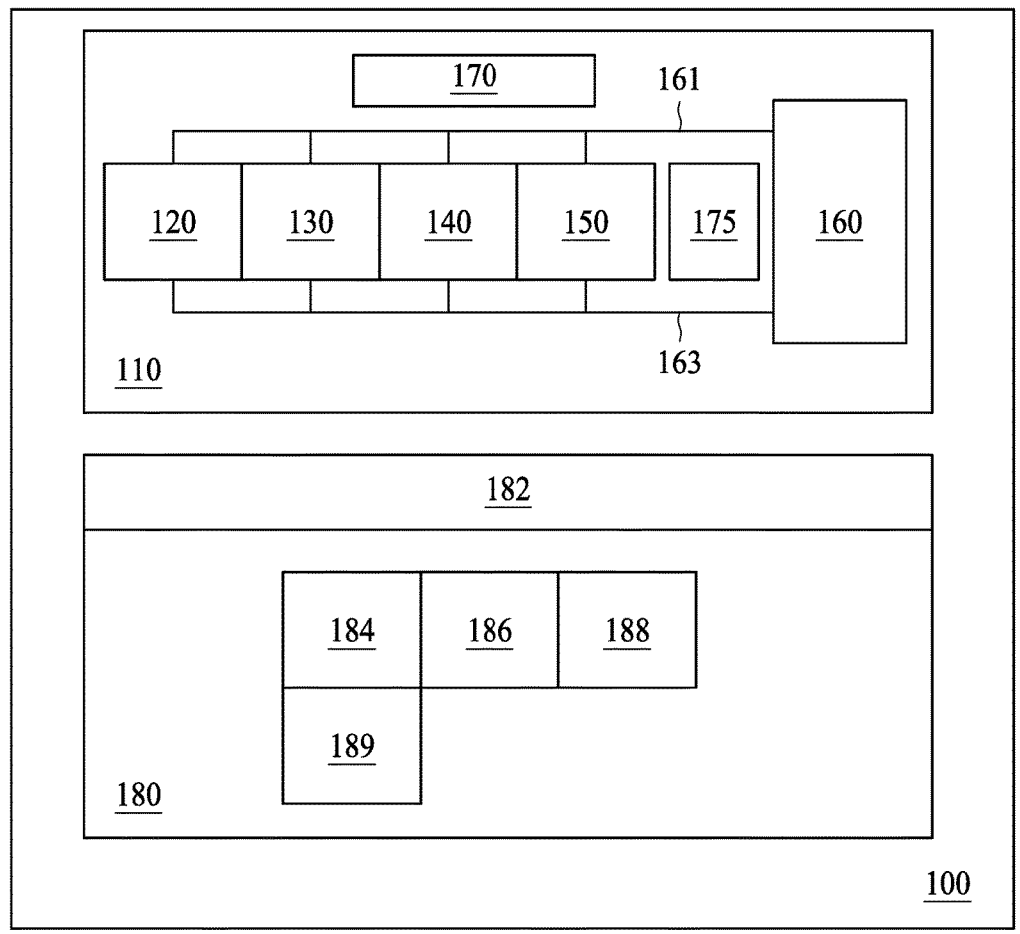
FIG. 1 is a schematic diagram illustrating the infrastructure of the mobile plastic recycling system according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Unless otherwise defined herein, scientific and technical terminologies employed in the present disclosure shall have the meanings that are commonly understood and used by one of ordinary skill in the art. Moreover, unless otherwise required by context, it will be understood that singular terms shall include plural forms of the same and plural terms shall include the singular. Also, as used herein and in the claims, the terms "at least one" and "one or more" have the same meaning and include one, two, three, or more. Furthermore, the phrases "at least one of A, B, and C", "at least one of A, B, or C" and "at least one of A, B and/or C," as use throughout this specification and the appended claims, are intended to cover A alone, B alone, C alone, A and B together, B and C together, A and C together, as well as A, B, and C together.

The present disclosure provides a novel mobile plastic recycling system and method to solve the issues existing in the related art. The present mobile plastic recycling system has excellent maneuverability and is not limited to geographic constraints, and hence, it may be transported to any desired location and carry out the plastic recycling process on-site to produce recycled plastic particles. Moreover, the power supply of the present mobile plastic recycling system adopts a hybrid system of solar energy and diesel generation, in which the solar energy is used as the primary source for manufacturing the recycled plastic particles.

FIG. 1 is a schematic diagram illustrating the infrastructure of the mobile plastic recycling system 100 according to one embodiment of the present disclosure. The present mobile plastic recycling system 100 comprises a plastic recycling apparatus 110 and a power supply apparatus 180. The plastic recycling apparatus 110 and the power supply apparatus 180 of the mobile plastic recycling system 100 are installed separately in a same container or in different containers, and are carried and transported by a vehicle. For example, the vehicle may be a trailer that comprises a truck tractor for towing the cargo (e.g., the present plastic recycling apparatus 110 and power supply apparatus 180) and one or more decks serving as the loading plane for the cargo.

Figure 2:
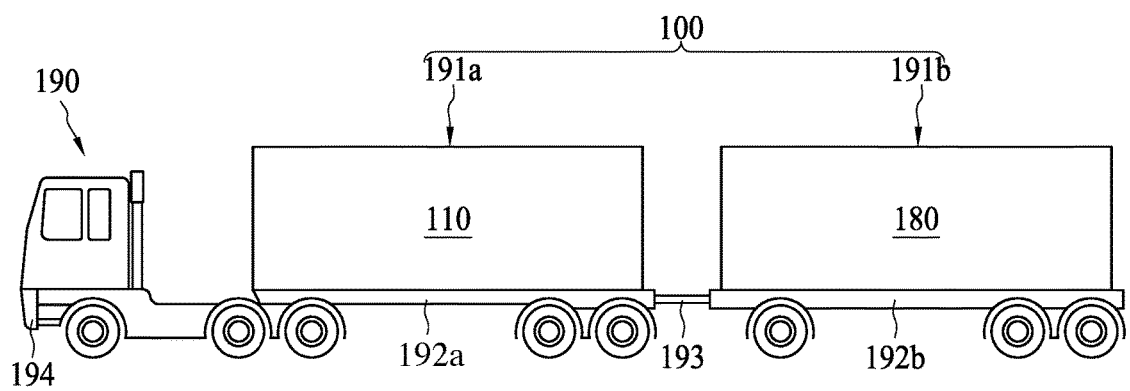
FIG. 2 is a schematic diagram illustrating the configuration of the power supply apparatus and the vehicle of the plastic recycling apparatus according to one embodiment of the present disclosure.

In some examples, the vehicle for transporting the mobile plastic recycling system 100 is a tandem tractor trailer as illustrated in FIG. 2. Briefly, the vehicle 190 comprises a truck tractor 194 and two decks 192a and 192b. As an example, rather than a limitation, the first deck 192a may have a kingpin (not shown), which is attached with fifth wheel (not shown) of the truck tractor 194. The first deck 192a and the second deck 192b is connected via a coupling bar 193; however, the present invention is not limited thereto. In these embodiments, the plastic recycling apparatus 110 is installed in a first container 191a, whereas the power supply apparatus 180 is installed in a second container 191b. The two containers 191a and 191b are respectively loaded on the two decks 192a and 192b. In preferred embodiments, solar panels of the power supply apparatus 180 and, optionally, solar panels of the plastic recycling apparatus 110 are disposed on the two opposing lateral walls at the long side and the top wall of the containers 191a and 191b.

As could be appreciated, each of the decks 192a and 192b may have suitable structures (such as the bulkhead and the rub rails) to keep the container on place and/or protect the container from side impact; the configurations of such structures are well-known in the art, and hence, detailed description regarding these structures are omitted herein for the sake of brevity. Further, it should be noted that, although the term "container" is used in this embodiment, the present invention is not limited hereto. Rather, in some cases, the deck may be a flatbed, wherein the plastic recycling apparatus 110 and/or the power supply apparatus 180 may be placed on the flatbed, and detachable side panels and top panels are assembled on the flatbed. In this way, the present mobile plastic recycling system 100 may be transported to any desired location by the vehicle 190. Also, it should be noted that according to other embodiments of the present disclosure, the plastic recycling apparatus 110 may be installed in the second container 191b, while the power supply apparatus 180 may be installed in the first container 191a. The above-mentioned configuration of the mobile plastic recycling system 100 and the vehicle 190 is also applicable in the embodiments discussed hereinbelow, such as the embodiment illustrated in FIG. 3.

Figure 3:
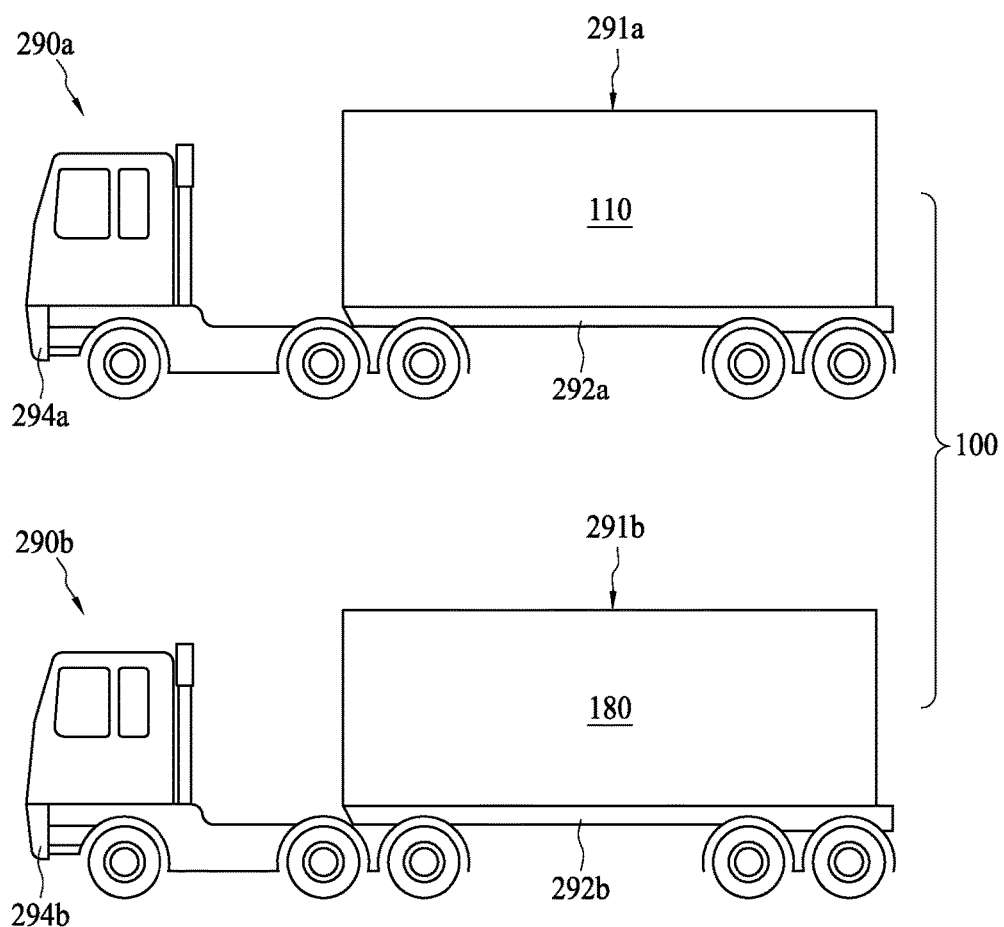
FIG. 3 is a schematic diagram illustrating the configuration of the plastic recycling apparatus and power supply apparatus of the plastic recycling apparatus according to another embodiment of the present disclosure.

In alternative embodiments, the present mobile plastic recycling system 100 may be transported by two separate vehicles; see FIG. 3. In this embodiment, the plastic recycling apparatus 110 is installed in a first container 291a, which is loaded onto a first deck 292a; the first deck 292a is coupled with a first truck tractor 294a of a first vehicle 290a. On the other hand, the power supply apparatus 180 is installed in a second container 291b, which is loaded onto a second deck 292b; the second deck 292b is coupled with a second truck tractor 294b of a second vehicle 290b.

Detailed structure and specific configuration of the plastic recycling apparatus 110 and power supply apparatus 180 of the present mobile plastic recycling system 100 is discussed next.

Figure 4:
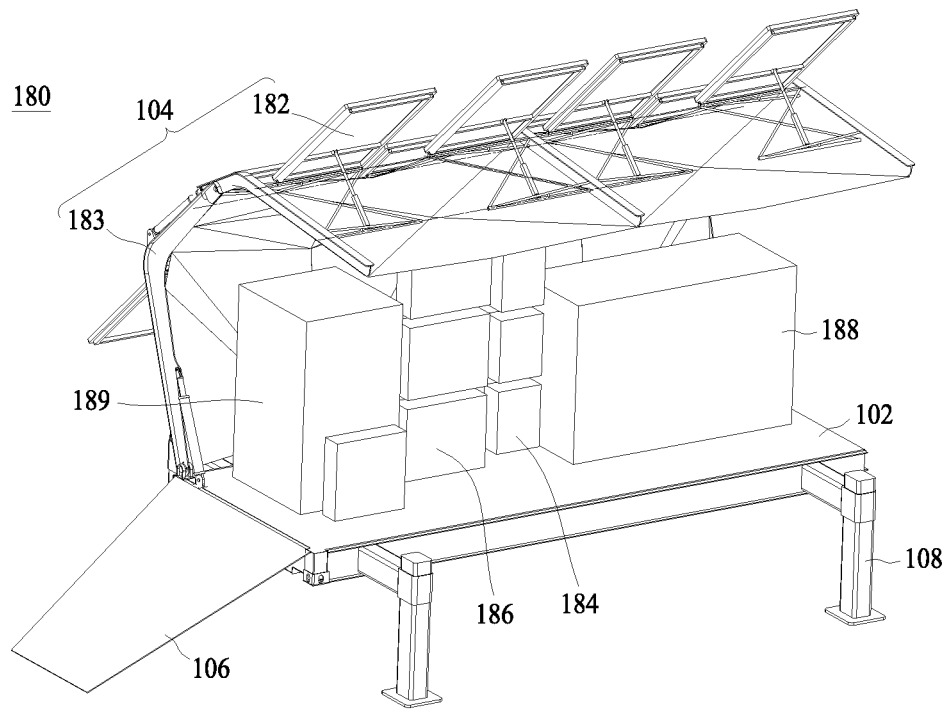
FIG. 4 is a schematic diagram illustrating both the appearance and internal configuration of the power supply apparatus according to one embodiment of the present disclosure.

Reference is first made to both FIG. 1 and FIG. 4, in which FIG. 4 is a schematic diagram illustrating both the appearance and internal configuration of the power supply apparatus 180 according to one embodiment of the present disclosure. As could be appreciated, the power supply apparatus 180 is utilized to supply the power to the plastic recycling apparatus 110 for recycling the waste plastic articles and making them into recycled plastic particles and/processing the same into plastic raw materials with a specific shape. To overcome the constraints due to the environment or access to energy, the present power supply apparatus 180 adopts a hybrid system of solar energy and diesel generation, in which the solar energy is used as the primary source for the plastic recycling apparatus 110. In this way, the mobile plastic recycling system 100 may operate effectively despite being in an environment where the resource is sparse without being limited to the geography and/or natural resources.

As illustrated in FIG. 4, the housing of the power supply apparatus 180 is shaped as a container that comprises a base 102, an upper cover 104, two short side walls 106 (only one is illustrated in the drawing for the sake of brevity), and four retractable posts 108 (only two are illustrated due to perspective of the drawing). It should be noted that in most cases, the container is carried by a vehicle to a destination; however, in FIG. 4, the vehicle itself is omitted for the sake of simplicity and brevity.

The top cover 104 comprises a frame 183 and a plurality of first solar panels 182 are installed in the frame. Together, the frame 183 and first solar panels 182 forms the two long side walls and the top wall of the container. The first solar panels 182 may be disposed on one of the side walls or the top wall, or any combination thereof.

As could be appreciated, the housing of the power supply apparatus 180, as illustrated in FIG. 4, is in an open position so that the components/devices inside the housing is visible to the reader to facilitate the understanding of the present invention. Usually, the power supply apparatus 180 would be configured in such open position when the power supply apparatus 180 has been transported to a desired location and when the weather allows for it. Specifically, when the power supply apparatus 180 is in the open position, the retractable posts 108 would stretch out from the original retracted position and rest against the ground; and since the four retractable posts may be adjusted independently, the present power supply apparatus 180 may be placed firmly on the ground even in rugged area. Also, one or both of the short side walls 106 may be laid down to a position as illustrated in FIG. 4 so that it may serve as a platform that allows the staff to enter the interior space of the container. On the other hand, when the power supply apparatus 180 is en route, the top cover 104 is often in a closed position (not shown), in which the two bottom rims at the opposing long side walls are fixed to the long side of the base 102. Additionally, the two short side walls 106 are also in the closed position during transportation. Further, the four retractable posts 108 are in the retracted position while the power supply apparatus 180 is in transit.

Structurally, the base 102 and the top cover 104 are designed such that the top cover 104 may be switched between the closed and open positions as desired. One bottom rim of the frame 183 and one long side of the base 102 are configured with suitable components and elements so that said bottom rim is detachably engaged to said long side of the base 102. The frame 183 and base 102 are also configured with suitable components and elements so that the frame 183 may rotate with respect to an axis along the other long side of the base 102. The frame 183 and first solar panels 182 are also configured with suitable components and elements that allow each first solar panels 182 to change its orientation as needed. The first solar panels 182 are configured to receive the solar radiation and convert the solar energy into electricity, and the orientation of one or more of the first solar panels 182 may be altered to best fit the incoming solar radiation thereby maximizing the energy conversion efficiency of the power supply apparatus 180.

The power supply apparatus 180 also comprises an invertor 184, a rechargeable battery 186, a diesel-electric generator set 188, and a hub 189 disposed within the container. These devices/elements are interconnected via the hub 189 so that they are in electric connection.

Specifically, the first solar panels 182, upon receiving the solar radiation, convert the solar energy into a direct current (DC), which is converted into an alternating current (AC) by the invertor 184, which is then supplied to the plastic recycling apparatus 110 via the hub 189. In the case where the plastic recycling apparatus 110 is not operating or when the electric energy generated by the first solar panels 182 outweighs the energy consumed by the plastic recycling apparatus 110 for the recycling operation, the excess electric energy may be converted from AC to DC by the invertor 184 and then stored in the rechargeable battery 186 via the hub 189. On the other hand, when the energy generated by the first solar panels 182 are insufficient for the normal operation of the plastic recycling apparatus 110, the power supply apparatus 180 may again convert the electric energy stored in the rechargeable battery 186 from DC to AC using the invertor 184 and then supplies the same to the plastic recycling apparatus 110. Furthermore, when there is no electric energy left in the rechargeable battery 186, and the solar panel 182 cannot generate the electricity due to the weather, then, the diesel-electric generator set 188 may be activated to convert the diesel into the electric energy and charge the rechargeable battery 186, so that the rechargeable battery 186 may supply the energy to the plastic recycling apparatus 110 for its operation.

Figure 5A:
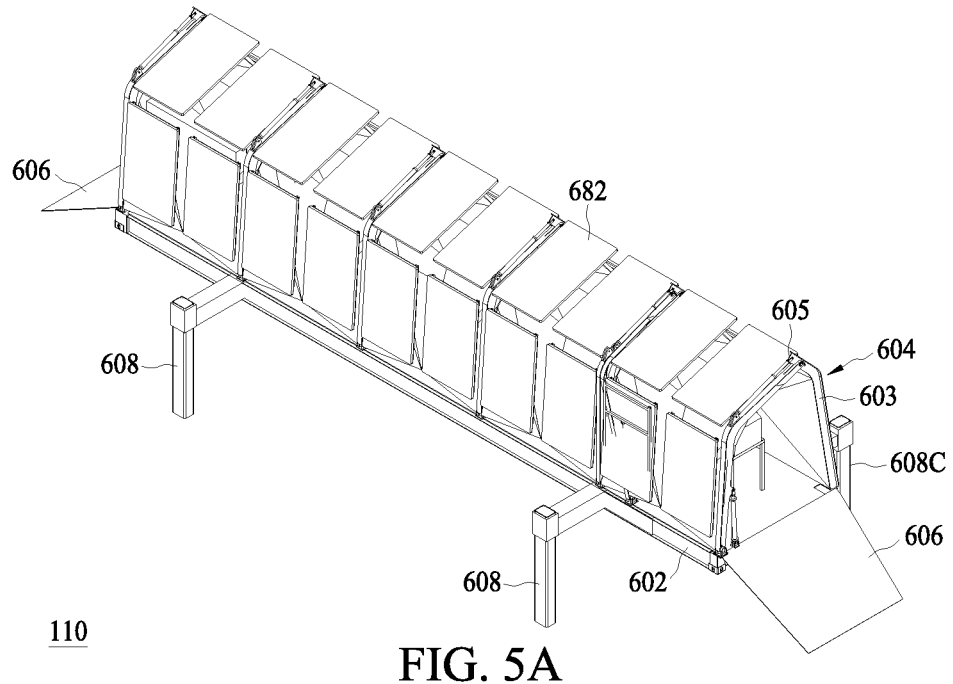
Figure 5B:
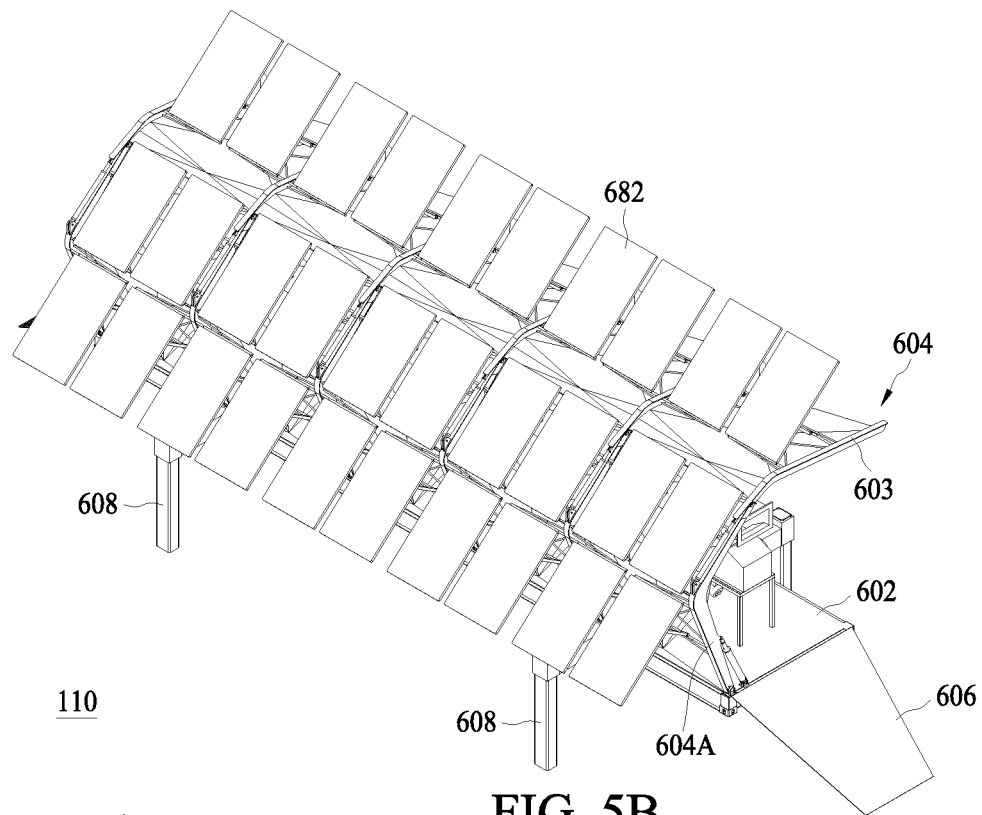
Figure 5C:
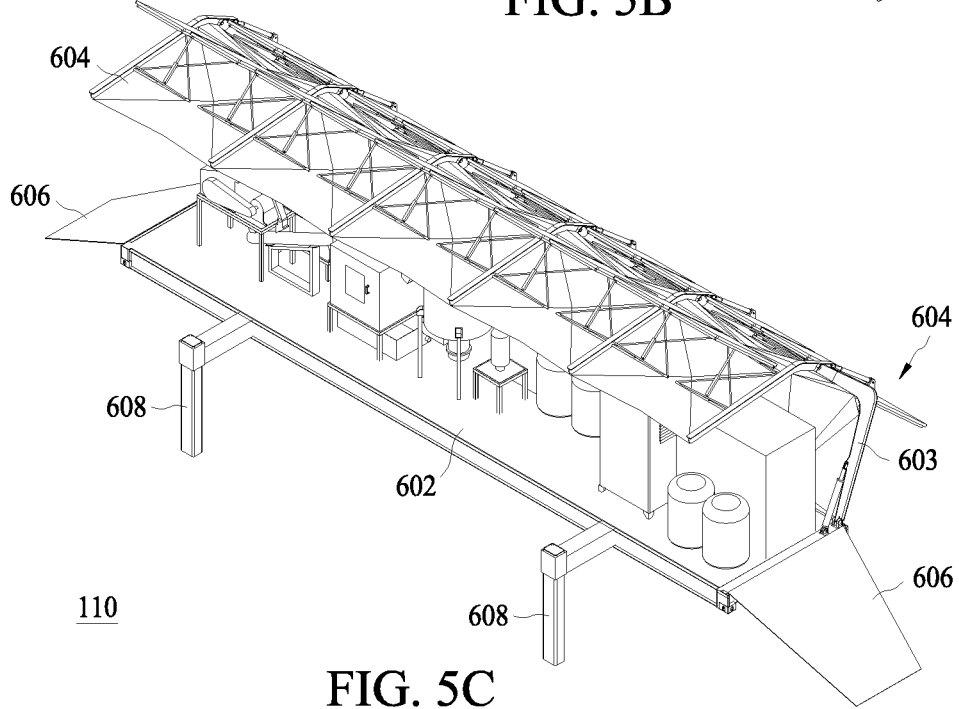

Reference is now directed to FIG. 5A to FIG. 5C, which are schematic diagrams illustrating the appearance of the plastic recycling apparatus 110 according to one embodiment of the present disclosure. In the present embodiment, the housing of the plastic recycling apparatus 110 is shaped as a container that comprises a base 602, a top cover 604, two short side walls 606 and four retractable posts 608. As illustrated in FIG. 5A, the base 602 has a rectangular shape. The top cover 604, when in the closed position, has a cross-section of inversed U shape. The structure and configuration of the top cover 604 of the plastic recycling apparatus 110 are similar to those of the top cover 104 of the power supply apparatus 180. Briefly, the top cover 604 comprises a frame 603 and, optionally, a plurality of second solar panels 682 disposed on either one or both side walls or the top wall of the top cover 604, or a combination thereof. One bottom rim of the frame 603 is detachably fixed with one long side of the base 602, while the top cover 604 is configured to rotate with respect to an axis along the other long side of the base 602. In this way, the top cover 604 is configured to be switched between the closed (e.g., FIG. 5A) and open (e.g., FIGS. 5B and 5C) positions as required; as an example, the frame 603 may be disposed with an oil-pressure rod to facilitate the switch. Also, the orientation of each second solar panel 682 may be adjusted (see, for example, FIGS. 5B and 5C). As could be appreciated, the structures and configurations of the first solar panels 182 and the frame 183 described above regarding the power supply apparatus 180 are also applicable to the second solar panels 682 and frame 603 of the plastic recycling apparatus 110. Furthermore, the side walls 606 and retractable posts 608 are respectively similar to the side walls 106 and retractable post 108 described above in connection with FIG. 4 both in structure and function.

Figure 6:
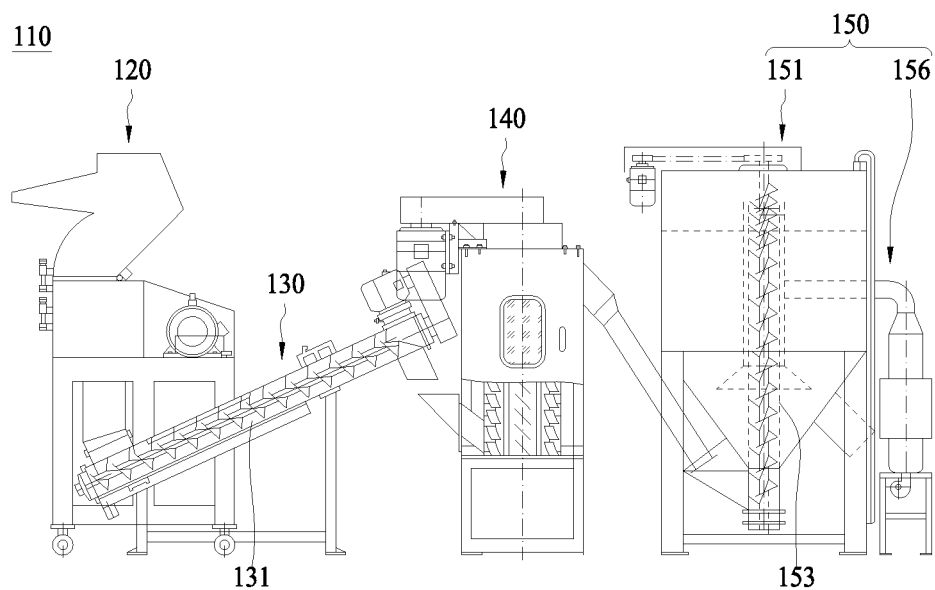
FIG. 6 is a partial cross-sectional view illustrating the configuration of the grinding machine, the spiral cleaning device, the centrifugal device, and the homogenizing device according to one embodiment of the present disclosure.
Figure 7A:
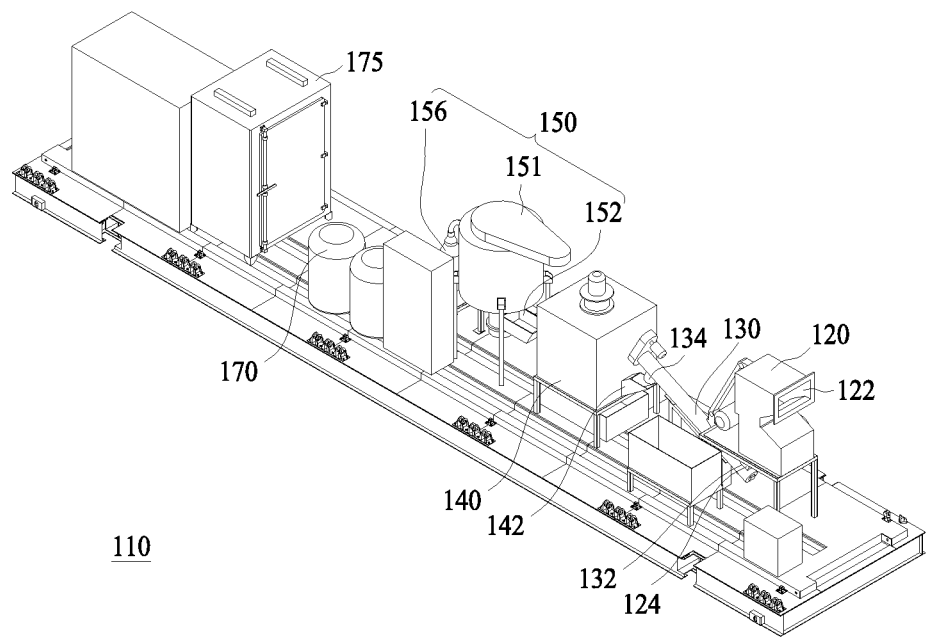
FIG. 7A and FIG. 7B are respectively the schematic left-hand view and right-hand view illustrating the internal configuration of the plastic recycling apparatus according to one embodiment of the present disclosure.
Figure 7B:
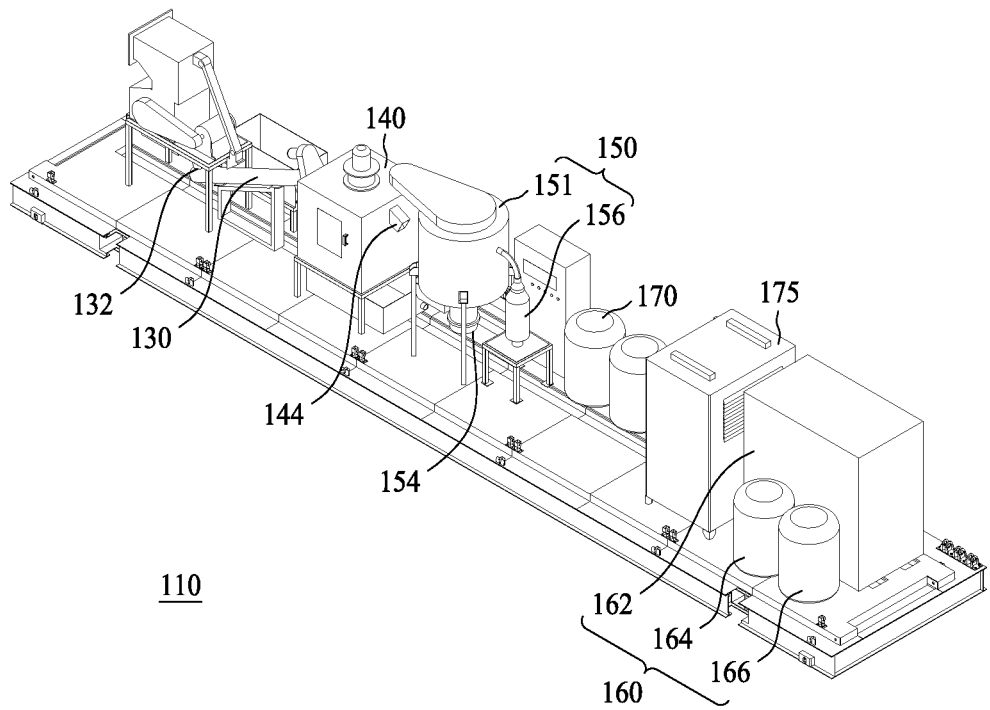

Reference is now directed to FIGS. 1 and 6 to 7B. FIG. 6 is a partial cross-sectional view illustrating the configuration of the grinding machine 120, the spiral cleaning device 130, the centrifugal device 140, and the homogenizing device 150, and FIG. 4 is a schematic diagram illustrating both the appearance and internal configuration of the power supply apparatus 180. FIG. 7A and FIG. 7B are respectively the schematic left-hand view and right-hand view illustrating the internal configuration of the plastic recycling apparatus 110.

The plastic recycling apparatus 110 as illustrated in FIGS. 1, 7A and 7B is configured to treat a plastic article, which is crushed by grinding, cleaned, and processed into recycled plastic particles; the plastic particles may be further processed into plastic raw materials with specific shapes or plastic products.

Specifically, the present plastic recycling apparatus 110 comprises the grinding machine 120, the spiral cleaning device 130, the centrifugal device 140, the homogenizing device 150, the heating device 175 and the water-circulating device 160 that form a production line. Briefly, during the recycling process of the plastic article, the collected plastic article is first crushed by the grinding machine 120 to obtain plastic debris, which are delivered into the spiral cleaning device 130 to remove the dust and distain therefrom, then the centrifugal device 140 is used to remove the water content of the plastic debris, and finally, the plastic debris are homogenized by the homogenizing device 150 to obtain the plastic particles.

The present mobile plastic recycling system 100 is intended to be used in any location as desired, and for places where natural resources (such as water) is limited, the plastic recycling apparatus 110 adopts a water-circulating device 160. In this way, the sewage generated during the recycling process may be collected, purified, and then reused in the subsequent recycling process. This is particular advantageous in the dessert or other places where access to water is limited. The water-circulating device 160 comprises a filter 162, a first tank for collecting clean water 164, and a second tank for collecting the sewage 166; also, the water-circulating device 160 is connected with the grinding machine 120, the spiral cleaning device 130, the centrifugal device 140, and the homogenizing device 150 via pipeline(s). During the operation, the present plastic recycling apparatus 110 collects the sewage generated by other components via a recovery pipeline 161; the sewage is then purified by the filter 162 to remove the impurities and generate clean water that is stored in the first tank for collecting clean water 164; next, the recycled clean water is discharged through the output pipeline 163 so that it could be used in the subsequent recycling process. Meanwhile, the sewage from the filter 162 is stored in the second tank for collecting the sewage 166. It should be noted that in order for the fluid (including the clean water and the sewage) to flow across the present water-circulating device as well as among the other components, the present water-circulating device 160 may preferably comprise a water pump (not shown). Persons having ordinary skill in the art may choose the location at which the pump is disposed in the water-circulating device 160 depending on the actual needs.

In optional embodiments, the filter 162 may be a reverse osmosis (RO) filtration system, a multi-medium filtration system or a combination of the two. In a preferred embodiment, the filter 162 is a combination of the RO filtration system and multi-medium filtration system; specifically, the multi-medium filtration system uses, primarily, the quartz sands and activated charcoal for filtering, wherein the quartz sands remove the larger solid particles and impurities that tend to settle, while the highly-absorbent activated charcoal is used for decolorization, deodorization and removing heavy metals, various dissolved organic compounds, radioactive elements and the like. On the other hand, the RO filtration system uses the pressure as the driving force, as well as the high interception characteristic of the synthetic polymer semi-permeable membrane, to separate the solid content(s) from the fluid, or uses the selective characteristic of the synthetic polymer semi-permeable membrane for components of different molecular weights to filter out the suspended matters, collides, proteins, and microbes in the fluid, thereby accomplishing the purposes of purification, separation and condensation of the liquid.

Moreover, the heating device 175 is disposed within the plastic recycling apparatus 110 and is configured to process the plastic particles so that they are melted by heat, the molten thermoplastic material is then cooled to form a recycled article with a specific shape (such as, a plastic brick). In one embodiment, the heating device 175 is an electric oven. Further, to manufacture the recycled articles of various shapes, the present mobile plastic recycling system 100 further comprises a molding device that is configured to accommodate the molten thermoplastic material. According to one preferred embodiment, the present mobile plastic recycling system 100 may recycle waste plastic articles and make them into thermoplastic items, such as plastic bricks that can be further used as construction materials for building use.

Referring now to FIG. 7A, FIG. 7B and FIG. 5, the grinding machine 120 has a first inlet 122 and first outlet 124. In one example, the grinding machine 120 deconstructs the plastic articles by cutting with the following specification, rotary cutter: 6 pieces, fixed cutter: 4 pieces, cutter shaft: V-shaped, and rotation speed: 550 rpm. The spiral cleaning device 130 has a second inlet 132 and a second outlet 134, wherein the second inlet 132 is disposed below the first outlet 124 of the grinding machine 120 and is configured to receive the plastic debris from the grinding machine 120. The spiral cleaning device 130 comprises a first spiral member 131 disposed therein, which delivers the plastic debris by means of rotation from the second inlet 132 of the spiral cleaning device 130 to the second outlet 134. According to one embodiment, the first spiral member is a discontinuous helical blade (thickness: 4 mm). In one embodiment, the spiral cleaning device 130 uses a water pump (not shown) to deliver the clean, regenerated water in the first tank for collecting clean water 164 of the water-circulating device 160 to the spiral cleaning device 130 via the output pipeline 163 by means of rotation so that the clean water is used to clean the plastic debris. During the cleaning process, the water, under the action of the mutual friction between the plastic debris and the rod of the first spiral member, may remove the dust and distain from the plastic debris, and the waste water will leave the first spiral member under the action of the centrifugal force and flow to the bottom, whereas the cleaned plastic debris will be delivered upward to the second outlet 134 and enter a third inlet 142 of the centrifugal device 140. The centrifugal device 140 removes the residual water content from the cleaned plastic debris by high-speed centrifugation, and the plastic debris, under the action of the high-speed centrifugal force, falls from the third outlet 144 into a fourth inlet 152 of a silo 151 of the homogenizing device 150. In one embodiment, the centrifugal device 140 rotates at a speed of 1,000-1,600 rpm; for example, 1,000, 1,010, 1,020, 1,030, 1,040, 1,050, 1,060, 1,070, 1,080, 1,090, 1,100, 1,110, 1,120, 1,130, 1,140, 1,150, 1,160, 1,170, 1,180, 1,190, 1,200, 1,210, 1,220, 1,230, 1,240, 1,250, 1,260, 1,270, 1,280, 1,290, 1,300, 1,310, 1,320, 1,330, 1,340, 1,350, 1,360, 1,370, 1,380, 1,390, 1,400, 1,410, 1,420, 1,430, 1,440, 1,450, 1,460, 1,470, 1,480, 1,490, 1,500, 1,510, 1,520, 1,530, 1,540, 1,550, 1,560, 1,570, 1,580, 1,590, or 1,600 rpm. In one specific embodiment, the centrifugal device 140 rotates at a speed of about 1,470 rpm to remove the residual content of the plastic debris.

In one embodiment, a sewage processing tank (not shown) is disposed under the spiral cleaning device 130 and the two are in fluid communication with each other. The blockade of the water-circulating device 160 caused by the plastic debris often results in the malfunction of the water-circulating device 160. In order to avoid this situation, the sewage processing tank may comprise a first sieve (10 mesh) disposed below the spiral cleaning device 130 for preliminary sieving of the plastic debris, whereas the recovery pipeline 161 may comprise a second sieve (20 mech) disposed at the water inlet of the filter 162.

The homogenizing device 150 is a homogenizing silo, which configured to homogenize the above-mentioned cleaned and centrifugally-dried plastic debris. The homogenizing device 150 comprises a silo 151 and a hot-air dryer 156, wherein the silo 151 has a fourth inlet 152 and a fourth outlet 154, and comprises a second spiral member 153 configured to mix the plastic debris. The second spiral member is of a tapered spiral in which the pitches between any two blades are different so as to prevent the jamming of the thermoplastic material during the high-speed rotation. During the mixing, the homogenizing device 150 uses the hot-air dryer 156 to deliver a high-temperature fluid (i.e., a hot air blow) into the silo 151; this blow drying substantially decrease the water content of the plastic debris. Upon completion of the above-mentioned treating processes, the air-dried plastic debris (i.e., plastic particles) that exit from the fourth outlet 154 are stored in a storage tank (not shown).

To address the issues related to the fine dust and odor generated by the components of the plastic recycling apparatus 110 during the treatment process, the plastic recycling apparatus 110 may further comprise an air cleaning device 170 installed therein. The air cleaning device 170 is configured to purify the air within the plastic recycling apparatus 110 and provide a suitable working environment for the staff working therein. The air cleaning device 170 may use commercially-available filters such as activated charcoal or non-woven fabrics to absorb the dust or molecules associated with the odor.

Figure 8:
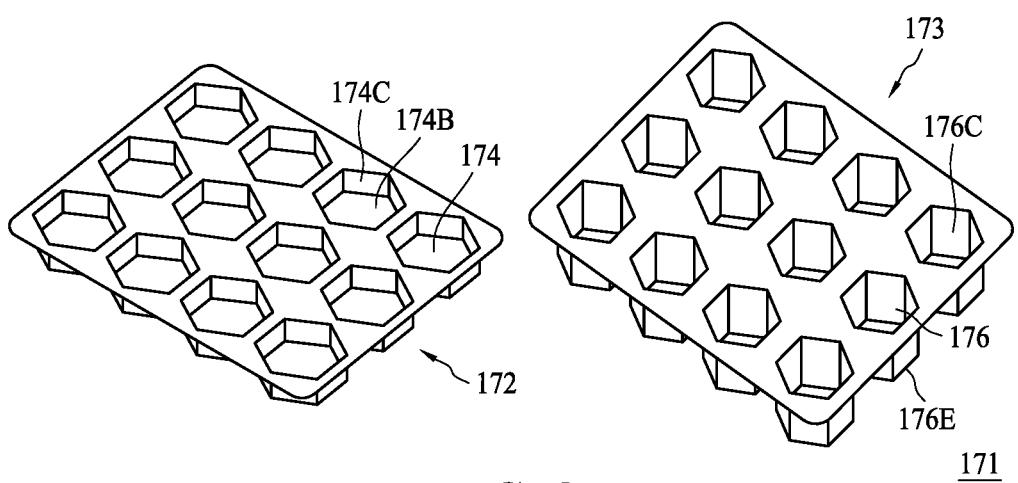
FIG. 8 is a schematic diagram illustrating the structure of the molding device according to one embodiment of the present disclosure.

FIG. 8 is a schematic diagram illustrating the structure of the molding device 171 according to one embodiment of the present disclosure. As illustrated, the molding device 171 comprises a shaping mold 172 and a filler mold 173. The shaping mold 172 comprises a plurality of mold cavities 174, which are configured to accommodate and shape the molten thermoplastic materials. Specifically, each of the mold cavities 174 has a circumferential side wall 174C and a bottom 174B. In non-limiting embodiments, the upper surface of the bottom 177B may have bumps and dips that facilitate mold release. Moreover, the filler mold 173 comprises a plurality of filling tubes 176 that are arranged corresponding to the mold cavities 173 of the shaping mold 172. Structurally, each filling tube 176 comprises a circumferential side wall 176C extending downward from the plate body of the filler mold 173, and has an open distal end 176E.

As an example, the mold cavities 174 of the shaping mold 172 and the filling tubes 176 of the filler mold 173 are hexagonal; however, persons having ordinary skill in the art may alter the shape thereof as needed. In optional embodiments, the shape of each mold cavity 174 of the shaping mold 172 may be rectangular, circular, elliptical, hexagonal or any other geometric shape. As could be appreciated, the shape of the filling tubes 176 of the filler mold 173 is the same as the mold cavity 174 of the matching shaping mold 172. Alternatively, the shape of the filling tubes 176 allows for the insertion of the filling tubes 176 into the filler mold 173. For example the filling tube 176 may be circular in shape while the mold cavity 174 is rectangular in shape, wherein the diameter of the filling tube 176 is less than the diameter width of the mold cavity 174.

Figure 9A:
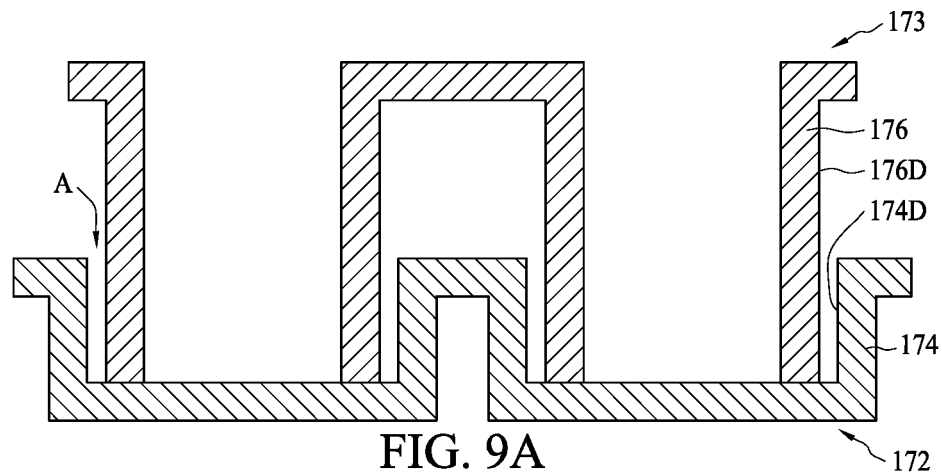
FIG. 9A to FIG. 9E are schematic diagrams illustrating the process of using the molding device of FIG. 8 in making the thermoplastic item according to one embodiment of the present disclosure.
Figure 9B:
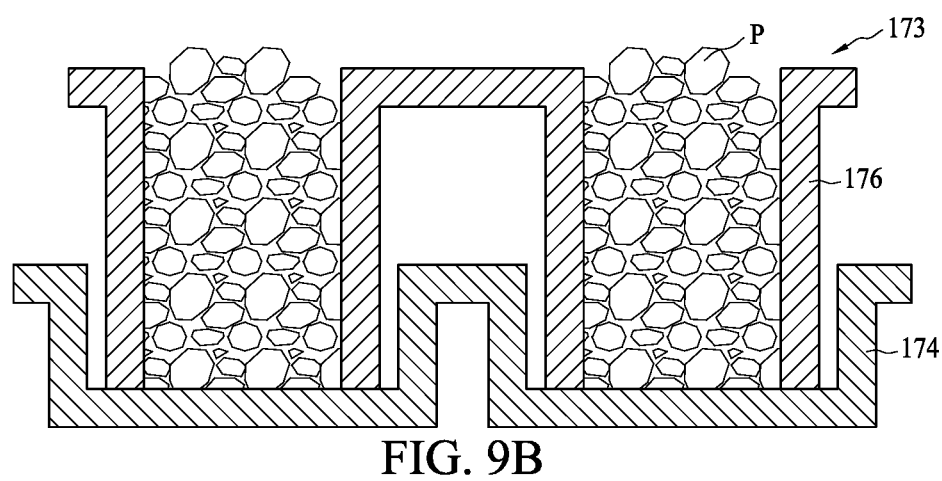

In FIG. 9A, the filling tubes 176 of the filler mold 173 are inserted into the mold cavities 174 of the shaping mold 172. As illustrated, there is a gap A between the outer surface 176D of each filling tube 176 and the inner surface 174 D of the mold cavity 174. According to various embodiments of the present disclosure, the gap is about 2 to 10 millimeters in width; for example, about 2, 3, 4, 5, 6, 7, 8, 9, or 10 mm. In one specific embodiment, the width of the gap is about 5 mm. Also, as illustrated in FIG. 9A, the height of the filling tube is greater than the depth of the mold cavity. According to certain embodiments of the present disclosure the height of the filling tube is at least twice the depth of the mold cavity.

The present disclosure is also directed to a method for recycling a plastic article; in particular, the present method uses the mobile plastic recycling system according to above aspect/embodiments to produce a plastic article. In one embodiment, the plastic article is made from polyethylene terephthalate (PET).

To facilitate the understanding of the present disclosure, the following method steps are described with referencing to the mobile plastic recycling system 100 illustrated in FIG. 1. First, the collected waste plastic articles are crushed using the grinding machine 120 (e.g., at a rotation speed of 550 rpm) so as to disintegrate the plastic article and produce plastic debris. Then, the plastic debris are washed using the spiral cleaning device 130 (for example, at a rotation speed of 350 rpm) to remove the dust and distain from the plastic debris; in some embodiments, the volume ratio of the thermoplastic material to be cleaned to the cleaning water is 1:2. After the cleaning step, the cleaned plastic debris are subjected to a centrifugal device 140 (which, operates at a rotation speed of 1,470 rpm) to remove the water content from the plastic debris. Then, the plastic debris are mixed using the homogenizing device 150 (e.g., at 120° C. for 1 hour), until the water content of the plastic debris is less than 0.2%, to obtain the plastic particles.

Further, it is also feasible to use the present mobile plastic recycling system 100 to process the plastic particles, in which the plastic particles made of the waste plastic article are melted and shaped into recycled thermoplastic materials with a particular shape, such as plastic bricks. For example, the present method may be implemented using the molding device 171 of FIG. 8 and the heating device 175 of FIG. 1.

Steps for melting and shaping the thermoplastic materials to obtain plastic raw materials with specific shapes or plastic products are discussed below with referencing to FIG. 9A to FIG. 9E.

Figure 9C:
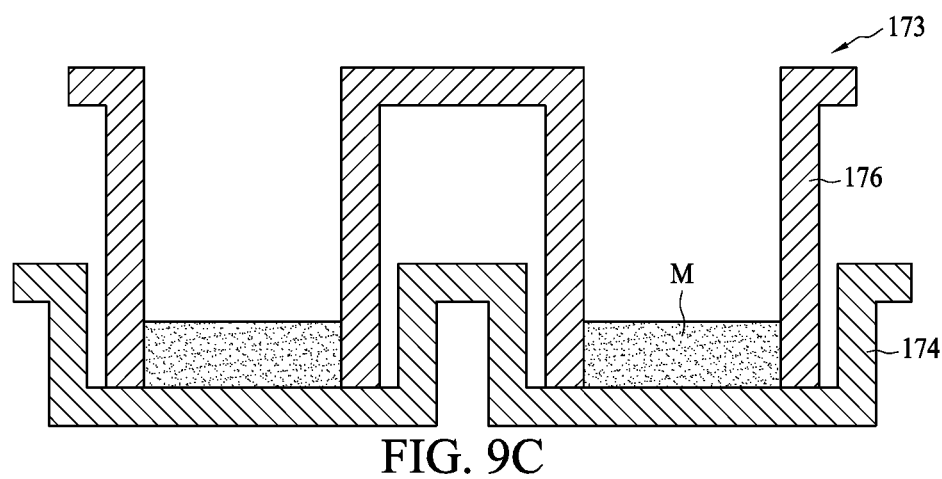
Figure 9D:
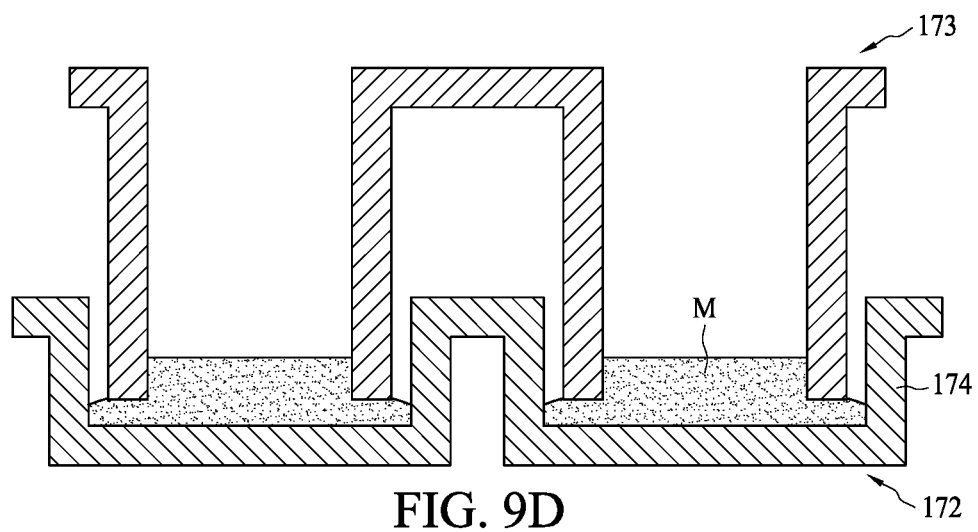
Figure 9E:
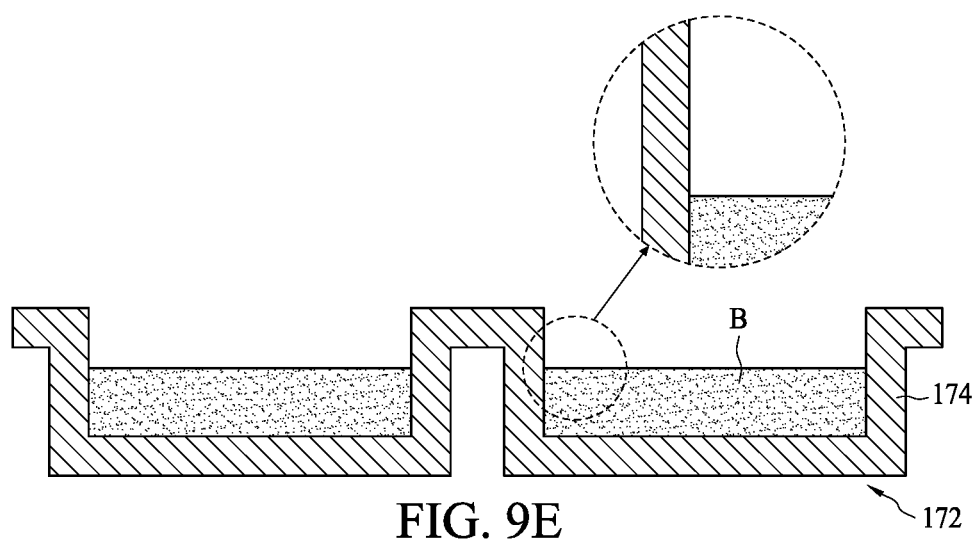

First, the filling tubes 176 filler mold 173 of the are placed into the mold cavities 174 of the shaping mold 172 so that the distal end of each filling tube 176 rests against the bottom of each mold cavity 174 (FIG. 9A). Then plastic particles P that are processed by the homogenizing device 150 are filled into the filling tubes 176 (FIG. 9), and the molding device 171 is placed in the heating device 175. The heating device 175 is configured to heat the plastic particles P at a condition sufficient to melt the plastic particles P (for example, at 290° C. for 50 minutes) so that the plastic particles P become a molten thermoplastic material M (FIG. 9C). Next, the filler mold 173 is lifted from the shaping mold 172 so that the molten thermoplastic material M flows across the whole extent of the base in each mold cavity 174 of the shaping mold 172 (FIG. 9D). The shaping mold 172 and the molten thermoplastic material M therein are then cooled to shape the molten thermoplastic material into plastic blocks B with a desired shape (FIG. 9E). The thus-formed plastic blocks are then released from the shaping mold 172.

Conventionally, the plastic particles are placed in the mold cavity of the shaping mold, and the molten thermoplastic material is formed directly in the shaping mold. However, the upper surface of the molten thermoplastic material is often seen with an indentation due to the surface tension of the molten thermoplastic material. In contrast, the present method first forms the molten thermoplastic material in the filling tube and then removes the filler mold 173 to allow the molten thermoplastic material to take up the shape of the mold cavity of the shaping mold. In this way, plastic blocks with a flat upper surface could be obtained.

It will be understood that the above description of embodiments is given by way of example only and that various modifications may be made by those with ordinary skill in the art. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A mobile plastic recycling system mounted in a vehicle for recycling a plastic article into a thermoplastic item, comprising a plastic recycling apparatus and a power supply apparatus electronically connected to the plastic recycling apparatus, wherein, the power supply apparatus comprises, a hub, electrically connected to the plastic recycling apparatus; a first solar panel, disposed external to the power supply apparatus and electrically connected to the hub; a rechargeable battery, disposed within the power supply apparatus and electrically connected to the hub, wherein the rechargeable battery is configured to store the electric energy; and a diesel-electric generator set, electrically connected to the rechargeable battery; and the plastic recycling apparatus comprises,
(1) a grinding machine, configured to fragment the plastic article into plastic debris, wherein the grinding machine has a first inlet and a first outlet;
(2) a spiral cleaning device, configured to clean the plastic debris, wherein,
the spiral cleaning device has a second inlet and a second outlet, wherein the second inlet is disposed under the first outlet of the grinding machine, and
the spiral cleaning device comprises a first spiral member disposed within the spiral cleaning device, wherein the first spiral member is configured to transmit the plastic debris from the second inlet to the second outlet by rotation;
(3) a centrifugal device, configured to remove water from the plastic debris, wherein the centrifugal device has a third inlet and a third outlet, and the third inlet is disposed under the second outlet;
(4) a homogenizing device, configured to mix and dry the plastic debris, wherein the homogenizing device comprises,
a silo, having a fourth inlet disposed on the silo and a fourth outlet disposed on the silo; and comprising a second spiral member disposed within the silo and configured to mix the plastic debris; and
a hot-air dryer, disposed at one side of the silo, and configured to provide a high-temperature fluid to dry the plastic debris that are being mixed within the silo;
(5) a heating device, disposed within the plastic recycling apparatus, and configured to heat and melt the plastic debris thereby forming the thermoplastic item; and
(6) a water-circulating device, comprising,
a recovery pipeline, wherein the recovery pipeline is in fluid communication with the grinding machine, the spiral cleaning device, the centrifugal device, and the homogenizing device, and is configured to collect the sewage produced by the grinding machine, the spiral cleaning device, the centrifugal device, and the homogenizing device during the recycling process;
a filter, in fluid communication with the recovery pipeline, and configured to purify the collected sewage to produce clear water; and
an output pipeline, in fluid communication with the grinding machine, the spiral cleaning device, the centrifugal device, and the homogenizing device, and configured to supply the clear water to the grinding machine, the spiral cleaning device, the centrifugal device, and the homogenizing device.

2. The mobile plastic recycling system of claim 1, further comprising an air cleaning device, disposed within the plastic recycling apparatus, and configured to clean the air inside the plastic recycling apparatus.

3. The mobile plastic recycling system of claim 1, further comprising a molding device, configured to accommodate the plastic debris and shape the same into the thermoplastic item.

4. The mobile plastic recycling system of claim 3, wherein the molding device comprises,
a shaping mold, comprising a plurality of mold cavities; and
a filler mold, comprising a plurality of filling tubes that are disposed corresponding to the mold cavities, wherein distal open ends of the filling tubes of the filler mold are configured to be inserted into the mold cavities of the shaping mold, respectively, and there is a gap between the outer wall of each filling tube and the inner wall of each mold cavity.

5. The mobile plastic recycling system of claim 4, wherein the height of the filling tube is greater than the depth of the mold cavity.

6. The mobile plastic recycling system of claim 5, wherein the height of the filling tube is at least twice the depth of the mold cavity.

7. The mobile plastic recycling system of claim 4, wherein the gap is 0.2-1.0 centimeter.

8. The mobile plastic recycling system of claim 1, further comprising a second solar panel disposed external to the plastic recycling apparatus, and electrically connected with the power supply apparatus.

9. The mobile plastic recycling system of claim 1, wherein the power supply apparatus and the plastic recycling apparatus are respectively disposed in two containers that are serial connected.

10. A method for recycling a plastic article into a thermoplastic item using the mobile plastic recycling system of claim 1, comprising,
(a) using the grinding machine to treat the plastic article, thereby producing plastic debris;
(b) using the spiral cleaning device to clean the plastic debris from the step (a), thereby removing the dirt and distain therefrom;
(c) using the centrifugal device to remove the water content from the plastic debris from the step (b);
(d) using the homogenizing device to homogenize the plastic debris from the step (c), thereby producing a plurality of plastic particles; and
(e) using the heating device to heat the plastic particles at a temperature sufficient to melt the plastic particles, thereby producing the thermoplastic item.

11. The method of claim 10, wherein the in the step (d), the homogenizing device is used to mix and dry the plastic debris from the step (c) at a temperature of at least 100° C. and below the melting temperature of the plastic debris for at least 1 hour.

12. The method of claim 11, wherein the in the step (d), the water content of the plastic particles is less than 0.2%.

13. The method of claim 10, wherein the in the step (e), the heating device heats the plastic particles at a temperature of at least 250° C. for at least 30 minutes.

14. The method of claim 10, wherein the mobile plastic recycling system further comprises a molding device, and in the step (e), the method comprises placing the plastic particles into a molding device, and then using the heating device to melt the plastic particles, thereby producing the thermoplastic item.

15. The method of claim 10, wherein the molding device comprises, a shaping mold that comprises a plurality of mold cavities, wherein each mold cavity has an inner base surface; and a filler mold that comprises a plurality of filling tubes disposed corresponding to the mold cavities, wherein each filling tube has a distal open end and an inner lateral surface; and in the step (e), the method further comprises the steps of,
- assembling the shaping mold and the filler mold into a mold assembly so that the distal end of each filling tube reaches the inner base surface of each mold cavity;
- placing the plastic particles into the gap formed by the inner lateral surface of the filling tube and the inner base surface of the mold cavity;
- using the heating device to heat the plastic particles at a temperature sufficient to melt the plastic particles to obtain a melted material;
- removing the filler mold from the mold assembly, thereby allowing the melted material to flow within the mold cavity; and
- cooling the melted material in the mold cavity, thereby producing the thermoplastic item having the shape of the mold cavity.

* * * * *